United States Patent [19]

Hawley et al.

[11] 3,989,851
[45] Nov. 2, 1976

[54] METHOD FOR PROTEIN FORTIFICATION OF EXTRA PUMPED MEATS

[75] Inventors: Robert Lyle Hawley; William Bayard Tuley, both of St. Louis, Mo.

[73] Assignee: Ralston Purina Company, St. Louis, Mo.

[22] Filed: Mar. 11, 1976

[21] Appl. No.: 665,830

Related U.S. Application Data

[63] Continuation-in-part of Ser. No. 500,219, Aug. 26, 1974, abandoned.

[52] U.S. Cl. .............................. 426/266; 426/264; 426/281; 426/641; 426/643; 426/644
[51] Int. Cl.² ...................... A23L 1/27; A23B 4/02; A23B 4/14; A23L 1/31
[58] Field of Search ........... 426/656, 657, 652, 281, 426/654, 332, 321, 641, 643, 644, 647, 264, 266, 335

[56] References Cited

UNITED STATES PATENTS

| | | | |
|---|---|---|---|
| 2,442,663 | 1/1948 | Rinehart | 426/212 |
| 2,767,096 | 10/1956 | Schotte | 426/281 |
| 3,506,455 | 4/1970 | Savage et al. | 426/281 |
| 3,552,978 | 1/1971 | Inklaar | 426/281 |
| 3,573,063 | 3/1971 | Williams | 426/281 |
| 3,615,689 | 10/1971 | Malinow et al. | 426/281 |
| 3,649,299 | 3/1972 | Sholl | 426/281 |
| 3,681,095 | 8/1972 | Inklaar | 426/281 |
| 3,782,975 | 1/1974 | Zyss | 426/281 |
| 3,835,223 | 9/1974 | Schwall et al. | 426/281 |

OTHER PUBLICATIONS

Moerman; Investigation into the Application of Promine–in Cooked Canned Hams (Report No. R2239) by the Central Institute for Nutrition and Food Research in Brussels in Aug. 1966.

*Primary Examiner*—S. Leon Bashore
*Assistant Examiner*—Steve Alvo
*Attorney, Agent, or Firm*—Veo Peoples, Jr.

[57] ABSTRACT

Meats are effectively pumped in excess of 140% of their green weights, yet maintain their original proteinaceous posture and nutritional value by a critically controlled preparation and injection of a protein medium. A salt tolerance protein isolate is hydrated in water and subsequently curing salts are admixed to the hydrated salt tolerant protein isolate. Upon curing the liquid medium, which has been pumped into the meat, cooks to a uniformly distributed, meat-like gel, the extra pumped meat product maintains the same nutritional protein value and substantially identical textural properties of natural meat tissue, the protein substantially retains its hydrated form in the final product and there is substantially no protein separation.

6 Claims, No Drawings

METHOD FOR PROTEIN FORTIFICATION OF EXTRA PUMPED MEATS

BACKGROUND OF THE INVENTION

This application is a continuation-in-part of copending application Ser. No. 500,219, filed Aug. 26, 1974, and now abandoned.

The present invention relates to protein fortification of cured meats.

It is known to add certain inorganic phosphoruscontaining compounds, especially polyphosphates, to meat and meat products in order to improve their structure and juice retention, especially when heated.

For example, hams are injected with aqueous solutions of table salt and sodium polyphosphate, which not only cause an improved color but also a better juice retention. By this injection the water, the ham's proteins and aromatics dissolved therein, and the meat juices are better retained during subsequent processing, such as cooking and/or smoking.

Additionally, it is known to incorporate pure, naturally occurring amino acids and mixtures of amino acids, derived from hydrolysis of natural proteins, into cure solutions in order to overcome taste defects and other imperfections encountered during curing.

For the reasons discussed in U.S. Pat. 2,767,096 with substantial clarity and completeness, it has been the general practice to conduct the above-described injection procedures through the circulatory systems, including the veins and arteries, of cured meats.

These techniques have been very successful and widely adopted throughout the United States, yet they have also met considerable skepticism. For example, in spite of the excellent distribution of cured solutions via artery and vein pumping, the meat cannot be pumped in excess of 110% of its green weight (weight prior to heat processing wherein shrinking occurs) without significant loss in nutritive value. Since amino acids have a finer particle size and are more readily dispersed in aqueous media, and were believed to be more efficiently circulated than pure protein isolates, attempts were made to bolster the protein content of pumped hams by injection of amino acids. However, in spite of the improvement in taste experienced with limited levels of amino acids, when amounts sufficient to provide adequate nutritive value were utilized, a severely undesirable off-taste developed. In the face of a rapidly increasing food shortage throughout the world, the need to provide pumped meats even in excess of 140% of their green weights serves to magnify the previous taste defects and other problems beyond practical acceptability.

The only previous attempt to extra-pump meats with soy protein isolate was reported by the Central Institute for Nutrition and Food Research in Brussels, Belgium in August of 1966 (Report No. R2239). It was therein concluded that artery and vein pumping was impossible and that stitch pumping directly into the muscle tissue could provide a 6% improvement in protein content for hams pumped to only 121% of their green weights. But the protein and method of making the medium create an unsuitable product when pumped above 140% green weight because there is a separation of protein. Additionally, the protein was found to decrease the juice retention characteristics of the cure solution.

Accordingly, a method of providing pumped meats in excess of 140% of their green weights and simultaneously fortifying the protein content in excess of 6% so as to provide a finished cooked product with a salt tolerant nutritious protein content substantially identical to that of unpumped meats would substantially advance the art.

SUMMARY OF THE INVENTION

It is an object of the present invention to provide a method for extra pumping meat such as ham at a yield in excess of 140% of its green weight and fortified with a protein level equivalent to that of an unpumped ham, yet avoiding degradation of the protein and taste.

Other objects will become apparent from the following description of the invention.

Generally, the objects of this invention are fulfilled by controlled preparation of a curing medium containing proteinaceous material, oleaginous material, and conventional curing ingredients. The medium is stitch pumped into the muscle tissue of the meat, taking care to avoid injection solely into veins and arteries.

DESCRIPTION OF THE PREFERRED EMBODIMENTS

The product of the present invention is a uniquely prepared high protein curing medium which is particularly advantageous in extra-pumping meats. The curing medium is composed of, in addition to conventional curing ingredients, proteinaceous material and, if desired, oleaginous materials.

The proteinaceous material of the curing medium is a food grade isolate, substantially devoid of the fibrous and carbohydrate materials naturally occurring in concert with the protein. The isolate is derived from either vegetable or animal sources provided it possesses physical and chemical characteristics amenable to the formation of an emulsion with hydrogenated vegetable oil, particularly that of salt tolerance; i.e., is stable in the presence of salt. Additionally, the isolate must form an irreversible gel upon heat setting. Gelatin, although a protein, is not within contemplation of this invention because it does not form an irreversible gel. Also, the protein isolate must be capable of providing the nutritional value of natural meat protein-gelatin also lacks this capability. Soy protein isolate is preferred for purposes of the present invention. It is important to note that other nutritious proteinaceous materials derived from both animal and vegetable sources can be utilized in the present invention provided they are modified to form stable dispersions or emulsions compatible with curing solids.

Generally, the amount of protein incorporated into the curing medium will be sufficient to provide a meat, pumped to in excess of 140% of its original or green weight, with the same nourishing proteinaceous posture as that of an unpumped meat. This amount must be in excess of 6% by weight of the curing medium. However, the amount cannot be so great as to render the curing medium too viscous to be pumped through injection needles. The precise amount will vary depending on the desired texture, flavor, taste, appearance, and type of meat product. Preferably protein isolate is utilized in an amount of from about 7–10% by weight of the curing medium. The final meat product will have an overall protein content of from about 17 to about 20% by weight of the meat for proper proteinaceous posture.

If desired, oleaginous materials such as hydrogenated vegetable oil, rendered animal fat such as beef tallow and lard, and adipose tissue can also be incorporated into the curing medium. By doing so, the medium will be in the form of an emulsion rather than a watery dispersion. This form is quite advantageous for several reasons. For example, since the level of solubility of protein in water is at most a colloidal dispersion, the emulsion will provide improved stability over the dispersion. Additionally, the emulsion serves to improve the cohesion of meat chunks when cured meats are rendered and subsequently recompacted.

The oleaginous material of the present invention can be selected from any of the many vegetable oils commercially available. Alternatively, other oils, rendered animal fats such as beef tallow and lard, and adipose tissue can be employed. The oils of this invention may be, for example, soy oil, corn oil, peanut oil, etc. The amount of oil can be 0 to 15% depending on whether a thick emulsion or dispersed solution is desired. It is preferred to utilize an emulsion having about 9% oil by weight of the curing medium.

The other curing ingredients are, for example, inorganic phosphates such as sodium tripolyphosphate, sodium hexametaphosphate, trisodium pyrophosphate, and monosodium orthophosphate; salts such as sodium chloride and sodium erythorbate; inorganic nitrogen sources such as sodium nitrate and nitrite; sugar such as that commonly used in meat curing; and, of course, water. The type and amounts of curing ingredients will vary depending on the type of meat to be cured. A typical formulation by weight based on overall weight of the curing medium for the present invention will contain 75 to 90% water, 4.0 to 10.0% NaCl, .1 to 2.0% sugar, 0.05 to 0.2% sodium nitrite, .005 to .01% sodium nitrate, and .05 to 0.2% sodium erythorbate.

It is critical in the preparation of the curing medium of the present invention that the protein isolate must be hydrated, in intimate contact with the water, prior to the addition of the curing salts. The phosphate and other salts must be added to the hydrated protein in dry form. If the hydrated protein is added to a solution of the phosphate, the protein will curd like cottage cheese. These curds significantly reduce the injection capability of the curing medium and will cause precipitation or unwarranted degradation of protein during the curing cycle. Additionally, previous problems in regard to moisture retention are significant results. It is believed that previous failures in extra pumping hams with protein isolates may have resulted from failure to observe this critical order of addition.

The curing medium is particularly desirable for pumping cured meats such as pork or red meat, poultry, fish, beef brisket, beef rounds and preferably hams to from about 140 to about 165% of their green weights. Even meats such as whale and mutton are within contemplation of this invention. Also the meats need not be fresh, they can also be washed meats.

In the process of the present invention the curing medium is stitch pumped directly into the muscle tissue of the meat. More specifically, meats for canned hams are excised from the bone prior to injection and if desired are recompacted and then injected. It is important to note that meats can be pumped to as low as 110% of green weight and distinctions over the prior art can still be observed. Although the distinctions are not nearly as drastic as at the 140% pumps, they are nonetheless characteristically different from other pumping procedures.

The product of this invention is a novel meat product which is uniformly distributed with an added protein gel. The meat-like gel is irreversibly heat set such that greater than 50% of the meat product consists of non-meat material yet the nutritional and textural properties of the meat are maintained. The elimination of protein separation is believed due to the fact that by changing the order of addition, the protein is more completely hydrated such that upon curing, the curing medium is converted to a gel, wherein the protein retains its hydrated form, thus remaining in tact.

This invention is further illustrated by the following specific examples. It is understood that the invention is not to be restricted to the details of these examples.

EXAMPLES

EXAMPLE 1

Two hams weighing approximately 18 lbs. were skinned, defatted and deboned by seaming the muscles. The meat was divided into three categories:

|     |           | Pounds |
|-----|-----------|--------|
| (a) | ham leans | 26     |
| (b) | lean trim | 3.5    |
| (c) | fat trim  | 3.0    |

The curing medium was prepared by first dispersing 2.336 lbs. of hydrolyzed soy protein isolate into 28.05 lbs. of water. Then the following amounts of solids were added:

| Solids                  | Pounds |
|-------------------------|--------|
| NaCl                    | 1.6    |
| Sodium tripolyphosphate | 0.3    |
| Sugar                   | .64    |
| $NaNO_3$                | .0384  |
| $NaNO_2$                | .0704  |

The ham leans were stitch pumped with this dispersion. The weight was pumped to 38.5 lbs. or 147% of green weight with no undesirable separation of protein. The ham was allowed to cure for 48 hours, then the leans were placed in a vacuum tumbler and 28 inches of vacuum was applied. They were tumbled for 6 hours, removed and pumped with an identical curing medium. The weight was increased to 42.6875 lbs. or a yield of 163% of green weight, with still no separation of protein.

EXAMPLE 2

Same as Example 1 except 9% of the curing medium (water portion) is replaced by hydrogenated vegetable oil. An emulsion is formed and injected. There are excellent results.

EXAMPLE 3

Same as Example 1 except part of the water is held out to dissolve the phosphate prior to admixing it with the protein. Curds form in the curing medium. Injection results in undesirable separation of protein and off-taste.

EXAMPLE 4

Same formula as example 1 except that the ham was pumped to 147% of green weight, placed in a meat massager for 18 hours and then heat processed for cure.

what is claimed is:

1. In a method of forming a meat product of the type wherein a liquid medium including a nutritional protein isolate, water and curing salt is prepared, stitch pumped into natural meat muscle tissue and allowed to cure, the improvement comprising:
   a. preparing the liquid medium by first hydrating, at least 7% by weight of the medium, a salt tolerant protein isolate which forms a gel upon heat setting, in water, prior to admixing the curing salts;
   b. subsequently admixing the curing salts to the hydrated salt tolerant protein isolate;
   c. stitch pumping the natural meat tissue with the liquid medium to from 140 to 165% of its green weight;

wherein, upon curing, the liquid medium cooks to a uniformly distributed, meat-like gel, the extra pumped meat product maintains the same nutritional protein value and substantially identical textural properties of natural meat tissue, the protein substantially retains its hydrated form in the final product and there is substantially no protein separation.

2. The method of claim 1 wherein the amount of protein isolate is from 7 to 10% by weight of the medium.

3. The method of claim 1 wherein the amount of water used to hydrate the protein is from about 75 to 90% by weight of the medium.

4. The method of claim 1 wherein the water is partially replaced by oleaginous material selected from the group consisting of hydrogenated oil, rendered animal fat and adipose tissue in an amount of about 9% by weight of the medium.

5. The method of claim 1 wherein the natural meat muscle tissue is selected from the group consisting of lean ham, beef briskets, beef rounds, poultry, mutton, whale and fish.

6. The method of claim 1 wherein the natural meat muscle tissue is lean ham.

* * * * *